United States Patent [19]

Yagi et al.

[11] Patent Number: 5,318,432
[45] Date of Patent: Jun. 7, 1994

[54] APPARATUS FOR FORMING POROUS PREFORM USED TO FABRICATE OPTICAL FIBER

[75] Inventors: Takeshi Yagi; Tsuguo Satou; Yoshiaki Koinuma; Kazuaki Yoshida, all of Tokyo, Japan

[73] Assignee: The Furukawa Electric Co., Ltd., Tokyo, Japan

[21] Appl. No.: 935,537

[22] Filed: Aug. 25, 1992

[30] Foreign Application Priority Data

Aug. 29, 1991 [JP] Japan .................. 3-218291
Apr. 21, 1992 [JP] Japan .................. 4-101086

[51] Int. Cl.$^5$ .................. B29C 47/06; C03B 37/023
[52] U.S. Cl. .................. 425/466; 65/3.11; 65/11.1; 425/467
[58] Field of Search .................. 65/3.11, 3.12, 18.1, 65/18.3, 11.11; 425/382.4, 466, 467

[56] References Cited

U.S. PATENT DOCUMENTS

| 1,585,149 | 5/1926 | Humphrey | 425/382.4 X |
|---|---|---|---|
| 3,248,469 | 4/1966 | Kosinsky et al. | 425/382.4 X |
| 4,302,172 | 11/1981 | Hogseth et al. | 425/382.4 X |
| 4,620,862 | 11/1986 | Dorn et al. | 65/18.1 |
| 4,622,000 | 11/1986 | Muller et al. | 425/467 |
| 4,661,136 | 4/1987 | Dorn et al. | 65/18.1 |
| 4,810,275 | 3/1989 | Gutu-Nelle et al. | 65/2 |
| 4,867,774 | 9/1989 | Dorn | 65/3.14 |
| 4,919,605 | 4/1990 | Kousai et al. | 425/467 |
| 4,921,414 | 5/1990 | Schliehe et al. | 425/382.4 X |
| 5,055,022 | 10/1991 | Hirschberger | 425/382.4 X |
| 5,169,421 | 12/1992 | Yagi et al. | 65/3.11 |
| 5,223,276 | 6/1993 | Djordjevic et al. | 425/382.4 X |

FOREIGN PATENT DOCUMENTS

| 0476537A2 | 3/1983 | European Pat. Off. |
| 0153619 | 9/1985 | Fed. Rep. of Germany . |
| 0202548 | 11/1986 | Fed. Rep. of Germany . |
| 0254266 | 1/1988 | Fed. Rep. of Germany . |

OTHER PUBLICATIONS

Ceramic Fabricating Process, by Yoichi Motoki, p. 45, published in Gihodo, 1987.

*Primary Examiner*—Robert L. Lindsay
*Attorney, Agent, or Firm*—Frishauf, Holtz, Goodman & Woodward

[57] ABSTRACT

An apparatus for forming a porous preform that is useable to an optical fiber by extruding a plastifiable material having silica powder as a main component thereof. The apparatus includes an extruding main body having a cylinder and a screw for extruding the plastifiable material from the cylinder and a material passage member connected to the cylinder so as to communicate therewith. The material passage member has a projection member which projects into the material passage member for preventing a lamination of the plastifiable material. The apparatus also includes a molding head connected to the material passage member so as to communicate therewith.

12 Claims, 3 Drawing Sheets

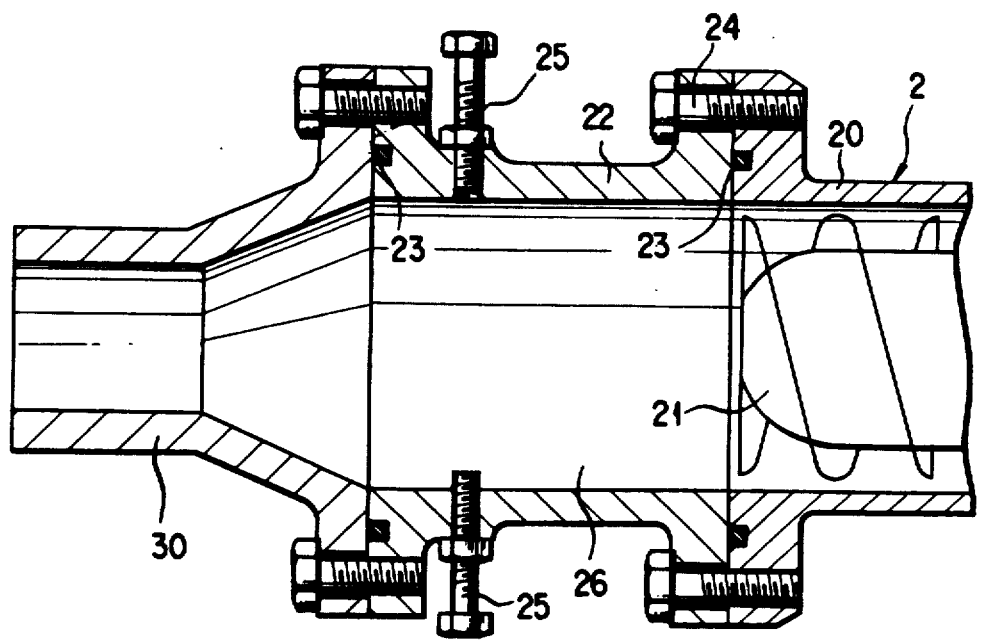
F I G. 2

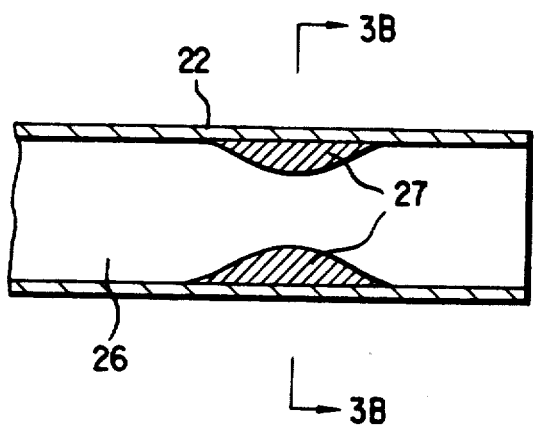 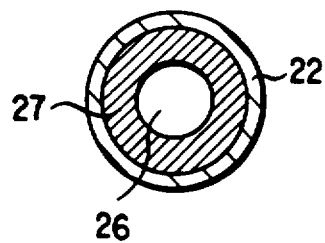
FIG. 3A          FIG. 3B
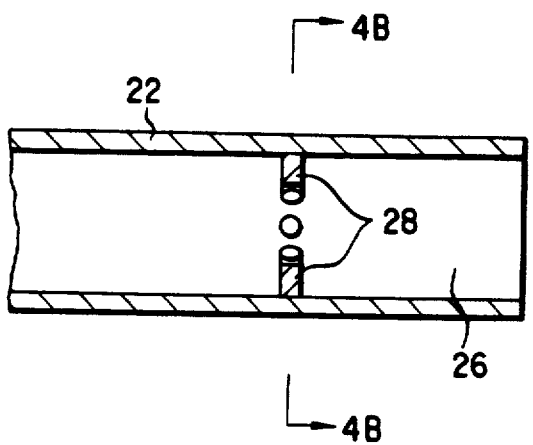 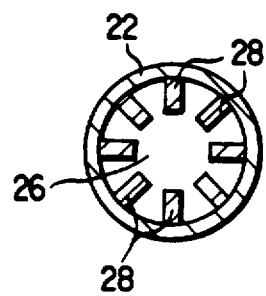
FIG. 4A          FIG. 4B
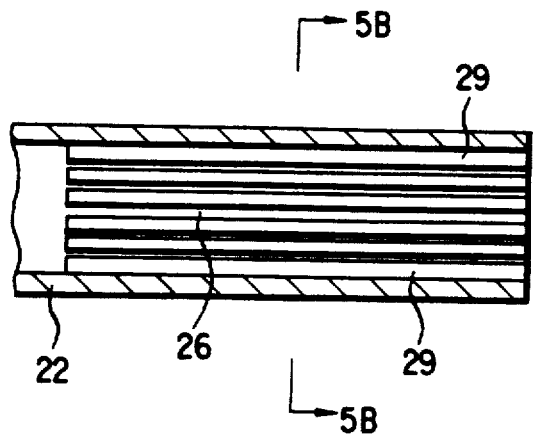 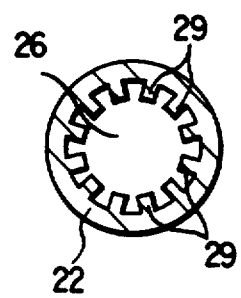
FIG. 5A          FIG. 5B

APPARATUS FOR FORMING POROUS PREFORM USED TO FABRICATE OPTICAL FIBER

BACKGROUND OF THE INVENTION

1. Field of the Invention

The present invention relates to an apparatus for forming a porous preform by extrusion that is used to fabricate an optical fiber.

2. Description of the Related Art

In general, as disclosed in Japanese Patent Application No. 18421/91 for example, in a method of forming a porous preform used to fabricate optical fiber by extrusion, a material mainly containing silica powder is mixed with a binder and water, the resultant mixture is kneaded, thereby forming a plastifiable material, and the plastifiable material is supplied to an extrusion machine to form a porous preform.

When a plastifiable material is extruded by means of an extrusion machine, it is rotated in a direction in which a screw is rotated in a cylinder of the extrusion machine. It is known that a layered defect, i.e. a so-called lamination, is formed in the extruded preform, if the plastifiable material does not stop rotating before it reaches a molding head (Yoichi Motoki, *Ceramic Fabricating Process*, published by Gihodo Shuppan, 1987, page 45).

As shown in FIG. 1, a conventional apparatus for forming a porous preform used to fabricate optical fiber by extrusion comprises an extruding main body 12 constituted by a cylinder 10 and a screw 11 which rotates in the cylinder 10 to extrude a plastifiable material, a cylindrical body 14 having a length of about 100 mm and connected to the cylinder 10 by an O-ring 13, and a molding head 15 connected to the cylindrical body 14 by the O-ring 13. Since the cylindrical body 14 is interposed between the extruding main body 12 and the molding head 15, the plastifiable material can stop rotating before it reaches the molding head 15.

Unlike other molded components, a porous preform must be prevented from even slight contamination so that the optical property of the final product, i.e. the optical fiber, may not be degraded. For this purpose, in the apparatus for forming a porous preform used to fabricate optical fiber, the metal portion of the extruding apparatus is plated with hard chromium.

If the cylindrical body 14 is plated with hard chromium, the rotation of the plastifiable material cannot be sufficiently stopped therein, since friction between the hard chrome and the plastifiable material is low. Hence, the resultant porous preform used to fabricate optical fiber contains a lamination defect. As a result, when the porous preform is sintered and changed to a transparent glassy rod, voids may be formed therein, due to this lamination defect.

SUMMARY OF THE INVENTION

It is an object of the present invention to provide an apparatus for forming a porous preform used to fabricate optical fiber, which produces a porous preform free from a lamination defect.

The object is achieved by an apparatus for forming a porous preform used to fabricate optical fiber by extruding a plastifiable material containing silica powder as its main component, the apparatus including: an extruding main body having a cylinder and a screw for extruding the plastifiable material from the cylinder; a material passage member connected to the cylinder so as to communicate therewith and having a rotation stopping member; and a molding head connected to the material passage member so as to communicate therewith.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a diagram showing an apparatus for forming a porous preform by extrusion to form optical fiber according to an embodiment of the present invention;

FIG. 3A is a diagram showing an example of the cylindrical body of the apparatus according to the present invention;

FIG. 3B is a cross-sectional view taken along the line 3B—3B in FIG. 3A;

FIG. 4A is a diagram showing another example of the cylindrical body of the apparatus according to the present invention;

FIG. 4B is a cross-sectional views taken along the lines 4B—4B in FIG. 4A;

FIG. 5A is a diagram showing still another example of the cylindrical body of the apparatus according to the present invention;

FIG. 5B is a cross-sectional views taken along the lines 5B—5B in FIG. 5A; and

DETAILED DESCRIPTION OF THE PREFERRED EMBODIMENTS

Figure 1:
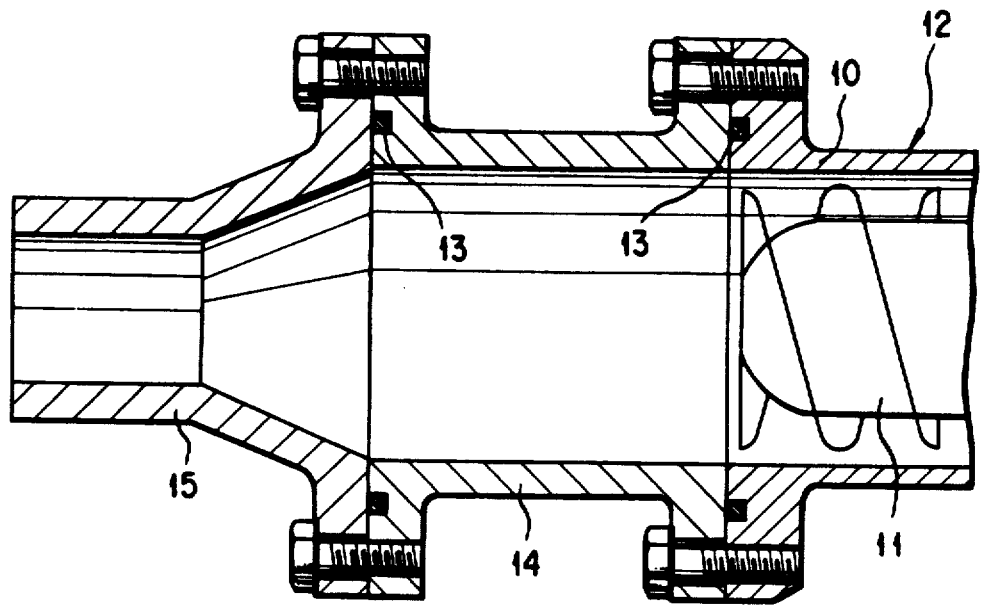
FIG. 1 is a diagram showing a conventional apparatus for forming a porous preform by extrusion used to fabricate optical fiber.

Embodiments of the present invention will now be described with reference to the accompanying drawings.

FIG. 2 shows an apparatus for forming a porous preform used to fabricate optical fiber according to an embodiment of the present invention. An extruding main body 2 comprises a cylinder 20 and a screw 21 for extruding a plastifiable material from the cylinder 20. The inner diameter of the cylinder 20 is about 80 mm.

A cylindrical body 22 is connected to the extruding main body 2 by an O-ring 23 so as to communicate therewith. The inner diameter of the cylindrical body 22 is substantially the same as that of the cylinder 20. The cylinder 20 and the cylindrical body 22 are fixed to each other by bolts 24.

The cylindrical body 22 has a plurality of rotation stopping means, i.e. rotation stopping bolts 25. The rotation stopping bolts 25 are screwed into threaded holes in the circumferential wall of the cylindrical body 22, and protrude in a material passage region 26 in the cylindrical body 22. Hence, it is possible to control the length of the projection of a rotation stopping bolt 25 projecting in the material passage region 26 by adjusting the degree of screwing the rotation stopping bolt 25. The rotation stopping bolts 25, serving as resistance elements against the circumferential rotation of the plastifiable material, stop rotation of the plastifiable material, thereby sufficiently preventing a lamination defect.

The rotation stopping means may be a projection 27 as shown in FIGS. 3A and 3B, which is formed continuously in the circumferential direction on the inner surface of the cylindrical body 22. Otherwise, it may be a plurality of projections 28 as shown in FIGS. 4A and 4B, which are arranged at intervals in the circumferential direction on the inner surface of the cylindrical body 22, or a plurality of projections 29 as shown in FIGS. 5A and 5B, which are aranged at regular intervals in the circumferential direction on the inner surface of the cylindrical body, extending in the longitudinal direction. The cylindrical body, serving as a material passage member, may be replaced by a member having a cross section other than a circle, for example, an ellipse, a rectangle, or a polygon, so that the passage member itself serves as rotation stopping means. In this case, rotation stopping bolts 25 or projections 27, 28 or 29 as shown in FIGS. 2 to 5 may be formed on the material passage member having a cross section other than a circle. In FIG. 2, the extruding main body 2 and the cylindrical body 22 are separable members. However, the cylinder 20 of the extruding main body 2 may be much longer so as to form rotation stopping means on an extending region.

A molding head 30 is connected to the cylindrical body 22 by an O-ring 23 so as to communicate with the material passage region 26.

The following are examples of forming a porous preform used to fabricate optical fiber, by means of the apparatus of the present invention:

EXAMPLE 1

100 parts by weight of silica powder having an average diameter of 8 μm was mixed with 3 parts by weight of methyl cellulose functioning as a binder and 22 parts by weight of pure water functioning as a solvent. The mixture was kneaded uniformly, thereby forming a plastifiable material.

The plastifiable material wa supplied to the extrusion machine as shown in FIG. 2 and subjected to an extrusion process. As a result, a porous preform of an outer diameter of about 30 mm and a length of about 500 mm was obtained. The cylindrical body 22 had an inner diameter of 80 mm and a length of 100 mm. 10 rotation stopping bolts 25 were inserted in the cylindrical body 22 at regular intervals in the circumferential direction. The rotation stopping bolts 25 were protruded by 20 mm from the inner surface of the cylindrical body.

The obtained porous preform for optical fiber was dried at the temperature of 110° C., and degreased in the air at the temperature of 500° C. for 5 hours. Further, it was purified in a $Cl_2$-containing He atmosphere at the temperature of 1200° C., and sintered in an He atmosphere at the temperature of 1600° C. As a result, a transparent glassy rod having an outer diameter of 25 mm and a length of 450 mm was obtained. The glassy rod did not include voids due to the lamination defect.

The glassy rod as a core rod was coated with a cladding material, i.e. an acrylic resin, thereby forming a plastic clad optical fiber (PCS fiber) having a core diameter of 200 mm and a clad diameter of 230 mm. The optical property of the optical fiber was satisfactory for practical purpose.

COMPARATIVE EXAMPLE 1

The plastifiable material used in the Example 1 was supplied to an extrusion machine in which a molding head was directly connected to an extruding main body, and subjected to an extrusion process. The resultant porous preform included cracks due to a lamination defect and was not satisfactory for practical purpose.

Figure 6:
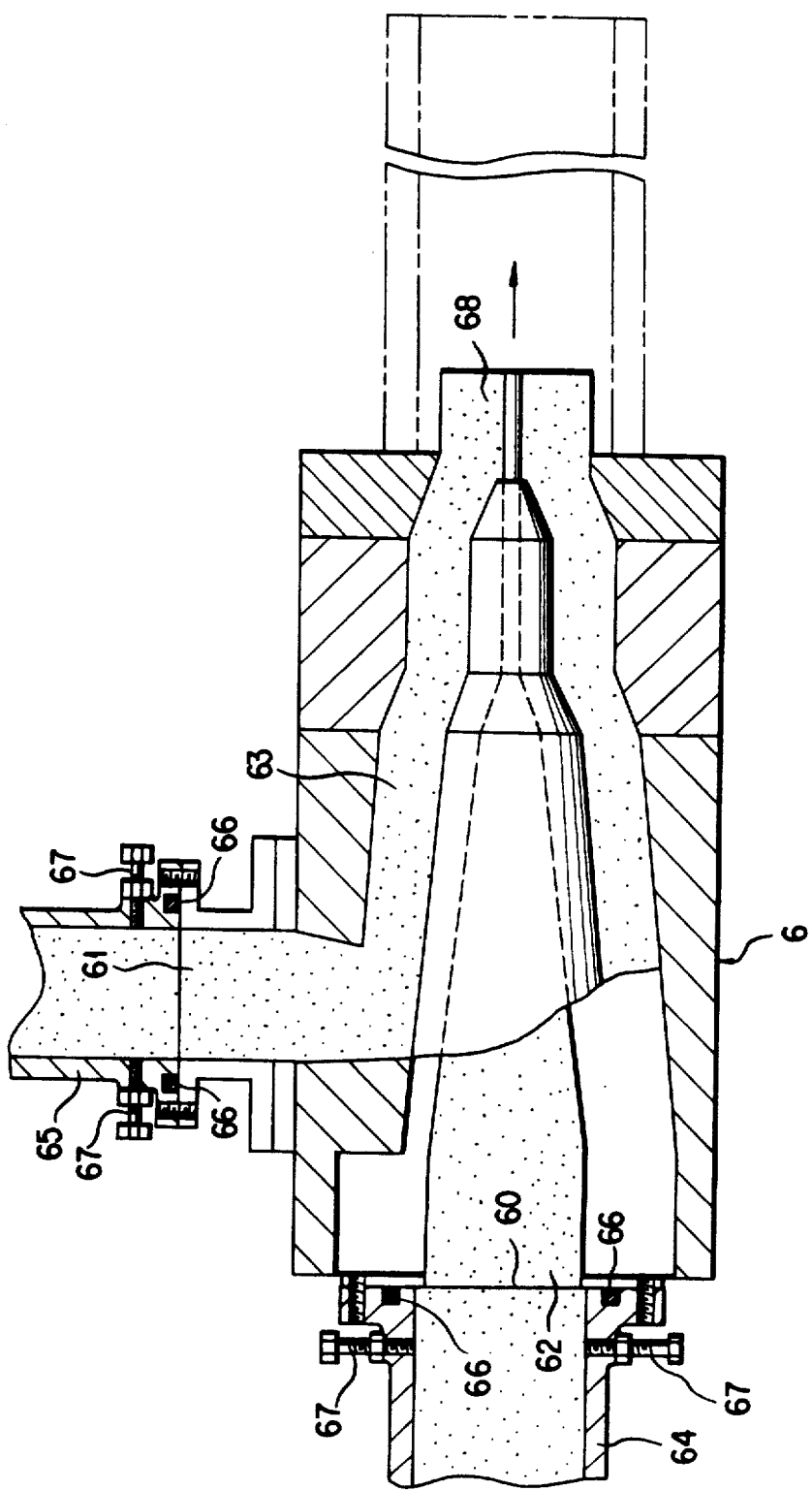
FIG. 6 is a diagram showing an apparatus for forming a porous preform by extrusion to form optical fiber according to another embodiment of the present invention.

FIG. 6 shows an apparatus for forming a porous preform used to fabricate optical fiber according to another embodiment of the present invention. A cross head 6 has a first material supplying port 60 and a second material supplying port 61. The first and second material supplying ports 60 and 61 respectively communicate with first and second material passages 62 and 63. First and second cylindrical bodies 64 and 65 are respectively connected to the first and second material supplying ports 60 and 61 by O-rings 66. A plurality of rotation stopping bolts 67 were inserted in each of the first and second cylindrical bodies 64 and 65.

In the apparatus thus arranged, plastifiable materials supplied through the first and second material passage 62 and 63 were put together at a junction 68 located in a distal end portion of the cross head 6. In this apparatus also, the rotation of the plastifiable materials was sufficiently stopped, thereby preventing a lamination defect, in the same manner as in the apparatus shown in FIG. 2.

EXAMPLE 2

100 parts by weight of silica powder containing $GeO_2$ of 3.5 wt %, compounded by frame-hydrolysis and having an average diameter of 0.7 μm, was mixed with 36 parts by weight of 10% polyvinyl alcohol (PVA) aqueous solution functioning as a binder. The mixture was kneaded uniformly, thereby forming a plastifiable material to be a core.

100 parts by weight of silica powder having an average diameter of 8 μm was mixed with 3 parts by weight of methyl cellulose functioning as a binder and 22 parts by weight of pure water functioning as a solvent. The mixture was kneaded, thereby forming a plastifiable material for cladding.

These plastifiable materials were supplied to the extrusion machine as shown in FIG. 6 and subjected to extrusion. The plastifiable material to be a core was supplied through the first material supplying port 60 and the plastifiable material for cladding was supplied through the second material supplying port 61. As a result, a porous preform used to fabricate optical fiber having an outer diameter of about 80 mm and a length of about 600 mm was obtained. The first and second cylindrical bodies 64 and 65 had an inner diameter of 80 mm and a length of 100 mm. 10 rotation stopping bolts 67 were inserted in each cylindrical body at regular intervals in the circumferential direction. The rotation stopping bolts 67 were protruded by 20 mm from the inner surface of the cylindrical body.

The obtained porous preform was dried at the temperature of 110° C., and degreased in the air at the temperature of 500° C. for 5 hours. Further, it was purified in a $Cl_2$-containing He atmosphere at the temperature of 1200° C., and sintered in an He atmosphere at the temperature of 1600° C. As a result, a transparent glassy rod for optical fiber, which did not include voids due to the lamination defect, was obtained.

The glassy rod was drawn by a conventional procedure, thereby forming a single-mode optical fiber having an outer diameter of 125 μm. The optical property of the optical fiber was satisfactory for practical purpose.

COMPARATIVE EXAMPLE 2

The plastifiable materials for a core and cladding used in the Example 2 were supplied to an extrusion machine in which cylindrical bodies having no rotation stopping bolts were connected to a cross head, and subjected to an extrusion process. The resultant porous preform included cracks due to a lamination defect, which were less than those in the Comparative Example 1, and was not satisfactory for practical purpose.

The porous preform was sintered, resulting in a transparent glassy rod in which voids were formed spirally along the lamination.

As has been described above, with the apparatus for forming a porous preform used to fabricate optical fiber of the present invention, since the rotation of a plastifiable material sufficiently stops by virtue of the rotation stopping means provided in the material passage member, a defect such as a crack due to lamination in the obtained porous preform is suppressed. Hence, the yield of producing porous preforms used to fabricate optical fiber can be increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for forming a porous preform that is usable to fabricate an optical fiber by extruding a plastifiable material having silica powder as a main component thereof, said apparatus comprising:
   an extruding main body having a cylinder and a screw for extruding said plastifiable material from said cylinder;
   a material passage member coupled to said cylinder so as to communicate therewith;
   said material passage member having a projection member projecting into a material passage region of said material passage member for preventing a rotation of said plastifiable material as said plastifiable material is being extruded, whereby a lamination of said plastifiable material is prevented; and
   a molding head coupled to said material passage member so as to communicate therewith.

2. An apparatus according to claim 1, wherein said material passage member is plated with a hard chromium plating layer.

3. An apparatus according to claim 1, wherein said projection member is continuously formed on an inner surface of said material passage member in a circumferential direction of said material passage member.

4. An apparatus according to claim 1, wherein said projection member comprises a plurality of projections arranged at regular intervals in a circumferential direction on an inner surface of one of said first and second material passage members.

5. An apparatus according to claim 1, wherein said projection member comprises a plurality of projections arranged at regular intervals in a circumferential direction on a respective inner surface of said first and second material passage members, each of said plurality of projections being continuously formed in a longitudinal direction of one of said material passage members.

6. An apparatus according to claim 1, wherein the cross section of said material passage member has a shape selected from a group consisting of an ellipse, a rectangle, and a polygon.

7. An apparatus for forming a porous preform that is usable to fabricate an optical fiber by extruding a plastifiable material having silica powder as a main component thereof, said apparatus comprising:
   a first extruding main body having a first cylinder and a first screw for extruding said plastifiable material from said cylinder;
   a second extruding main body having a second cylinder and a second screw for extruding said plastifiable material from said second cylinder;
   first and second material passage members, respectively coupled to said first and second cylinders of said first and second extruding main bodies so as to communicate therewith, said first and second material passage members respectively having a projection member projecting into a material passage region thereof for preventing a rotation of said plastifiable material as said plastifiable material is being extruded, whereby a lamination of said plastifiable material is prevented; and
   a molding head having:
     first and second material supplying ports;
     first and second material passages that respectively communicate with said first and second material supplying ports; and
     a junction where said first and second material passages and said first and second material supplying ports communicate with said first and second material passage members.

8. An apparatus according to claim 7, wherein said material passage member is plated with a hard chromium plating layer.

9. An apparatus according to claim 7, wherein said projection members of said first and second material passage members are continuously formed on an inner surface of each of said first and second material passage members in a respective circumferential direction of one of said first and second material passage members.

10. An apparatus according to claim 7, wherein each of said projection members comprises a plurality of projections arranged at regular intervals in a respective circumferential direction on a respective inner surface of one of said first and second material passage members.

11. An apparatus according to claim 7, wherein each of said projection members comprises a plurality of projections arranged at regular intervals in a circumferential direction on a respective inner surface of each of said first and second material passage members, each of said plurality of projections being continuously formed in a respective longitudinal direction of one of said first and second material passage members.

12. An apparatus according to claim 7, wherein a cross section of each of said first and second material passage members has a shape of one of an ellipse, a rectangle, and a polygon.

* * * * *

UNITED STATES PATENT AND TRADEMARK OFFICE
CERTIFICATE OF CORRECTION

PATENT NO. : 5,318,432
DATED : June 7, 1994
INVENTOR(S) : Takeshi YAGI et al

It is certified that error appears in the above-indentified patent and that said Letters Patent is hereby corrected as shown below:

On the Title Page, under [57] Abstract, line 3,

Change "to an" to --to fabricate an--

Signed and Sealed this

Fifteenth Day of November, 1994

Attest:

BRUCE LEHMAN

*Attesting Officer*          *Commissioner of Patents and Trademarks*